US011625396B2

(12) United States Patent
Levine et al.

(10) Patent No.: US 11,625,396 B2
(45) Date of Patent: Apr. 11, 2023

(54) SQL IMPLICATION DECIDER FOR MATERIALIZED VIEW SELECTION

(71) Applicant: Google LLC, Mountain View, CA (US)

(72) Inventors: Caleb Levine, Seattle, WA (US); Leonid Lyakhovitskiy, Sammamish, WA (US); Ting Cheung Lee, Kirkland, WA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/392,728

(22) Filed: Aug. 3, 2021

(65) Prior Publication Data

US 2022/0067043 A1 Mar. 3, 2022

Related U.S. Application Data

(60) Provisional application No. 63/073,746, filed on Sep. 2, 2020.

(51) Int. Cl.
*G06F 16/24* (2019.01)
*G06F 16/2453* (2019.01)
*G06F 16/27* (2019.01)
*G06F 16/242* (2019.01)

(52) U.S. Cl.
CPC ...... *G06F 16/24539* (2019.01); *G06F 16/244* (2019.01); *G06F 16/27* (2019.01)

(58) Field of Classification Search
CPC .. G06F 16/244; G06F 16/24539; G06F 16/27; G06F 16/273; G06F 16/275; G06F 16/278
See application file for complete search history.

(56) References Cited

U.S. PATENT DOCUMENTS

| 6,449,606 | B1 * | 9/2002 | Witkowski | ........ G06F 16/24539 |
| 6,748,392 | B1 * | 6/2004 | Galindo-Legaria | .......................... G06F 16/2456 707/999.102 |
| 2004/0034616 | A1 * | 2/2004 | Witkowski | ............ G06F 16/283 |
| 2006/0282424 | A1 * | 12/2006 | Larson | .............. G06F 16/24535 |
| 2009/0327255 | A1 |  12/2009 | Larson et al. | |
| 2011/0196857 | A1 * | 8/2011 | Chen | ................. G06F 16/24539 707/E17.089 |
| 2013/0262443 | A1 * | 10/2013 | Leida | ................ G06F 16/24534 707/E17.014 |

(Continued)

OTHER PUBLICATIONS

International Search Report and Written Opinion for International Application No. PCT/US2021/048409 dated Dec. 9, 2021. 13 pages.

*Primary Examiner* — Merilyn P Nguyen
(74) *Attorney, Agent, or Firm* — Lerner David LLP (57) ABSTRACT

A system and method for managing queries including receiving a new query comprising a first plurality of conjoined terms, accessing a filtered view of a database from memory, the filtered view being filtered by the previously received query according to a filter represented by a second plurality of conjoined terms, at least one of the first plurality of conjoined terms or the second plurality of conjoined terms including at least one NULL value, determining that the filter of the new query implies a filter of the previously received query, and based on the determination that the filter of the new query implies the filter of the previously received query, executing the new query using the filtered view of the previously received query.

21 Claims, 4 Drawing Sheets

(56) References Cited

U.S. PATENT DOCUMENTS

2015/0074135 A1* 3/2015 Beavin .............. G06F 16/24534
707/759

* cited by examiner

SQL IMPLICATION DECIDER FOR MATERIALIZED VIEW SELECTION

CROSS-REFERENCE TO RELATED PATENT APPLICATION

The present application claims the benefit of the filing date of U.S. Provisional Patent Application No. 63/073,746 filed Sep. 2, 2020, the disclosure of which is hereby incorporated herein by reference.

BACKGROUND

The technology relates generally to a method and system for accelerating SQL query processing using materialized views.

Typically, query processing may be accelerated using a materialized view of a data set as compared to a normal view of the data set. The materialized view may be already stored in a table and may be already indexed before a new query is received. If the materialized view can be used to process the new query. then the processing time may be significantly reduced.

Determining whether the materialized view can be used to process a new query requires determining whether the filtered data of a given stored materialized view includes all information needed to correctly and completely respond to the query. This may be accomplished by determining whether the new query can be rewritten as the previous query that produced the materialized view, or stated another way, determining whether the new query satisfies or implies the previous query. This determination may be made using a SAT (satisfiability) or UNSAT (unsatisfiability) checking algorithm. However, conventional SAT and UNSAT checking algorithms do not support SQL queries. This is because SQL supports NULL values. The indeterminate value of the NULL values adds a layer of uncertainty that makes determining whether one query implies another query impossible using known SAT and UNSAT checking algorithms.

BRIEF SUMMARY

One aspect of the present disclosure is directed to a method including: receiving, by one or more processors, a new query comprising a first plurality of conjoined terms; accessing, by the one or more processors, a filtered view of a database from memory, wherein the filtered view is filtered by the previously received query according to a filter represented by a second plurality of conjoined terms, wherein at least one of the first plurality of conjoined terms or the second plurality of conjoined terms includes at least one NULL value; determining that the filter of the new query implies a filter of the previously received query; and based on the determination that the filter of the new query implies the filter of the previously received query, executing the new query using the filtered view of the previously received query.

In some examples, determining that the filter of the new query implies the filter of the previously received query may include: rewriting the new query and the previously received query to share a common set of variables; rewriting the new query in disjunctive normal form; rewriting the previously received query in conjunctive normal form; and determining that each term of the rewritten new query implies each term of the rewritten previously received query, wherein the determination that the new query implies the previously received query is based on each term of the rewritten new query implying each term of the rewritten previously received query.

In some examples, either the previously received query or the new query may include a grouping operation, and determining that the filter of the new query implies the filter of the previously received query may include, before rewriting the new query in disjunctive normal form and the previously received query in conjunctive normal form, removing terms of the previously received query or the new query that refer to columns that are not keys of the grouping operation.

In some examples, determining that the filter of the new query implies the filter of the previously received query may include, before rewriting the new query in disjunctive normal form and the previously received query in conjunctive normal form, removing terms of the previously received query and of the new query that are structurally equivalent.

In some examples, the method may further include, after removing the terms of the previously received query and of the new query that are structurally equivalent, determining that the filter of the new query implies the filter of the previously received query based on part on none of the remaining terms referring to columns that are not grouping keys.

In some examples, determining that the filter of the new query implies the filter of the previously received query may include: rewriting the new query and the previously received query as a predicate establishing the new query as being true and the previously received query as being either false or NULL; rewriting the predicate in disjunctive normal form; and determining that each term of the rewritten predicate is incompatible with itself. The determination that the filter of the new query implies the filter of the previously received query may be based on each term of the rewritten predicate being incompatible with itself.

In some examples, the method may further include, before rewriting the predicate in disjunctive normal form comprises, simplifying at least a portion of the predicate representing the previously received query as being NULL.

In some examples, the method may further include: receiving, by one or more processors, a second new query comprising a third plurality of conjoined terms; accessing, by the one or more processors, the filtered view of the previously received query from memory, wherein at least one of the second plurality of conjoined terms or the third plurality of conjoined terms includes at least one NULL value; determining, by the one or more processors, that the filter of the second new query does not imply the filter of the previously received query; and in response to the determination that the filter of the second new query does not imply the filter of the previously received query, executing the second new query on the database.

In some examples, determining that the filter of the second new query does not imply the filter of the previously received query may include: rewriting the second new query and the previously received query as a predicate establishing the second new query as being true and the previously received query as being either false or NULL; rewriting the predicate in disjunctive normal form; and determining that at least one term of the rewritten predicate is not incompatible with itself, wherein the determination that the filter of the second new query does not imply the filter of the previously received query is based on the at least one term of the rewritten predicate not being incompatible with itself.

In some examples, determining that the filter of the second new query does not imply the filter of the previously received query may include: rewriting the second new query and the previously received query to share a common set of variables; rewriting the second new query in disjunctive normal form; rewriting the previously received query in conjunctive normal form; and determining that at least one term of the rewritten second new query does not imply at least one term of the rewritten previously received query, wherein the determination that the new query does not imply the previously received query is based on at least one term of the rewritten second new query not implying at least one term of the rewritten previously received query.

Another aspect of the present disclosure is directed to a system including memory for storing instructions and one or more processors coupled to the memory. The one or more processors may be configured to execute the stored instructions to receive a new query comprising a first plurality of conjoined terms, access from the memory a filtered view of a database filtered by a previously received query according to a filter, wherein the filtered view is represented by a second plurality of conjoined terms, and wherein at least one of the first plurality of conjoined terms or the second plurality of conjoined terms includes at least one NULL value; determine that the filter of the new query implies a filter of the previously received query; and based on the determination that the filter of the new query implies the filter of the previously received query, execute the new query using the filtered view of the database.

In some examples, the one or more processors may be configured to execute the stored instructions to rewrite the new query and the previously received query to share a common set of variables, rewrite the new query in disjunctive normal form, rewrite the previously received query in conjunctive normal form, and determine that each term of the rewritten new query implies each term of the rewritten previously received query, wherein the determination that the new query implies the previously received query is based on each term of the rewritten new query implying each term of the rewritten previously received query.

In some examples, either the previously received query or the new query includes a grouping operation. Determining that the filter of the new query implies the filter of the previously received query may include, before rewriting the new query in disjunctive normal form and the previously received query in conjunctive normal form, removing terms of the previously received query or the new query that refer to columns that are not keys of the grouping operation.

In some examples, the one or more processors may be configured to execute the stored instructions to, before the new query is rewritten in disjunctive normal form and the previously received query in conjunctive normal form, remove terms of the previously received query and of the new query that are structurally equivalent.

In some examples, the one or more processors may be configured to execute the stored instructions to: rewrite the new query and the previously received query as a predicate establishing the new query as being true and the previously received query as being either false or NULL, rewrite the predicate in disjunctive normal form, and determine that each term of the rewritten predicate is incompatible with itself. The determination that the filter of the new query implies the filter of the previously received query may be based on each term of the rewritten predicate being incompatible with itself.

In some examples, the one or more processors may be configured to execute the stored instructions to, before the predicate is rewritten in disjunctive normal form, simplify at least a portion of the predicate representing the previously received query as being NULL.

In some examples, the one or more processors may be configured to execute the stored instructions to receive, by one or more processors, a second new query comprising a third plurality of conjoined terms, access, by the one or more processors, the filtered view of the previously received query from memory, wherein at least one of the second plurality of conjoined terms or the third plurality of conjoined terms includes at least one NULL value, determine, by the one or more processors, that the filter of the second new query does not imply the filter of the previously received query, and in response to the determination that the filter of the new query does not imply the filter of the previously received query, execute the new query on the database.

In some examples, the one or more processors may be configured to execute the stored instructions to rewrite the second new query and the previously received query as a predicate establishing the second new query as being true and the previously received query as being either false or NULL, rewrite the predicate in disjunctive normal form, and determine that at least one term of the rewritten predicate is not incompatible with itself. The determination that the filter of the second new query does not imply the filter of the previously received query may be based on the at least one term of the rewritten predicate not being incompatible with itself.

In some examples, the one or more processors may be configured to execute the stored instructions to rewrite the second new query and the previously received query to share a common set of variables, rewrite the second new query in disjunctive normal form, rewrite the previously received query in conjunctive normal form, and determine that at least one term of the rewritten second new query does not imply at least one term of the rewritten previously received query. The determination that the new query does not imply the previously received query may be based on at least one term of the rewritten second new query not implying at least one term of the rewritten previously received query Yet another aspect of the disclosure is directed to a datacenter including a plurality of servers for storing a database and at least one materialized view of the database, wherein the materialized view is filtered by a previously received query according to a filter, and any of the example systems described herein.

In some examples, the plurality of servers may be configured to provide access to the materialized view of the database for execution of the new query in response to the determination that the filter of the new query implies the filter of the previously received query, and to provide access to the database for execution of the new query in response to a determination that the filter of the new query does not imply the filter of the previously received query.

DETAILED DESCRIPTION

The present disclosure provides a system and method that are capable of determining whether a new query implies a previous query, even if at least one of the new or previous queries includes at least one NULL value. In order to make this determination, the system rewrites each of the new and previous queries into smaller pieces that can be compared more easily to one another. This makes processing terms of each query containing a NULL operator easier to handle, this making the overall determination possible.

Figure 1:
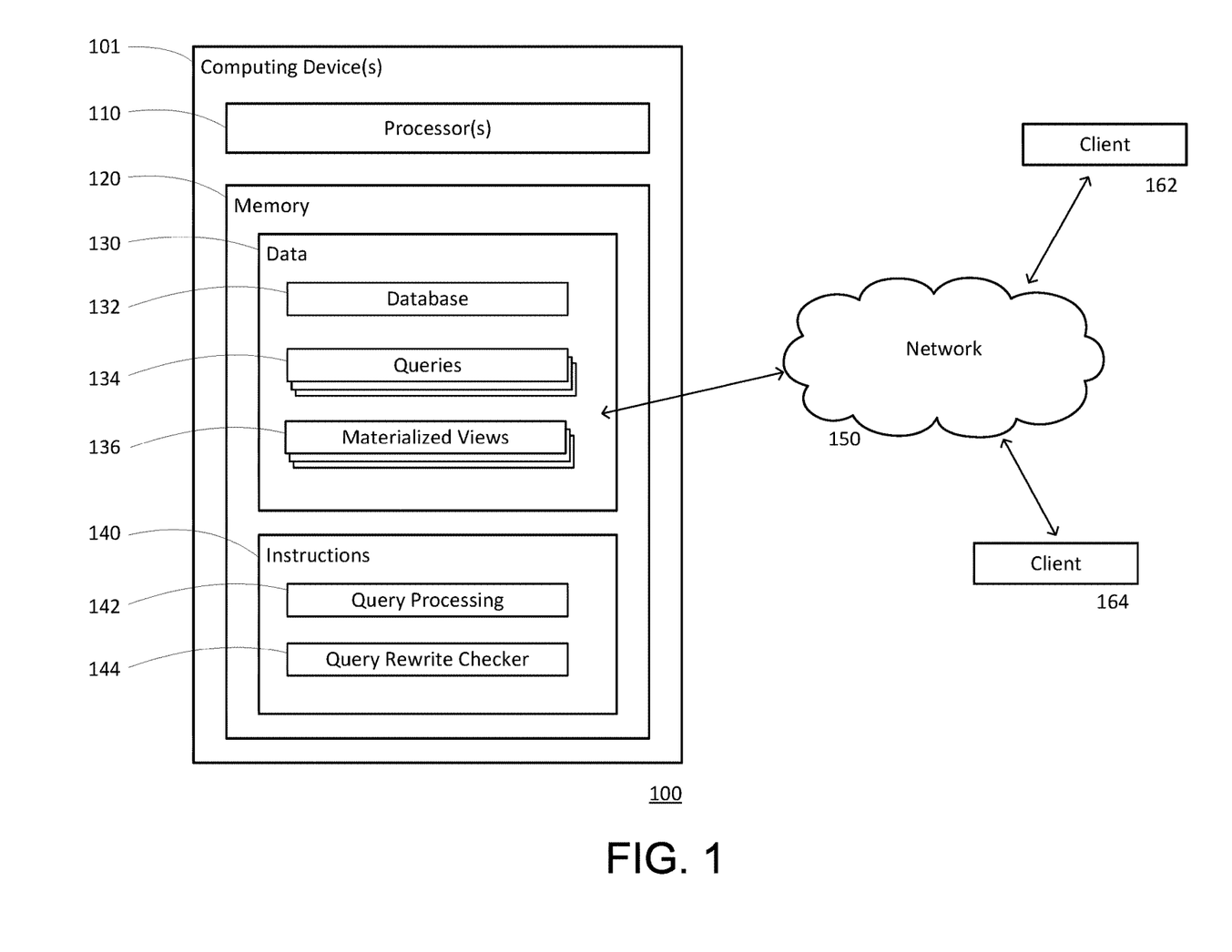
FIG. 1 is a block diagram illustrating an example system in accordance with an aspect of the present disclosure.

FIG. 1 is a block diagram illustrating an example system 100 including a computing environment for processing queries. The system 100 may include one or more computing devices 101 connected to clients 162, 164 through a network connection 150. The computing devices may include one or more processors 110, servers, shards, cells, or the like. It should be understood that the system 100 may include any number of computing devices 101 across a distributed network having any number of datacenters, that the number of computing devices in one datacenter may differ from a number of computing devices in another datacenter, and that the number of computing devices in a given datacenter may vary over time, for example, as hardware is removed, replaced, upgraded, or expanded. The computing devices 101 may be communicatively coupled to one another over the network 150. Thus, for example, a client may execute operations in "the cloud." Such operations may include uploading, accessing or processing data. Data access and processing may include querying a database to return a portion of the data included in the database.

The processors 110 of the one or more computing devices 101 may include well-known processors or other lesser-known types of processors. Alternatively, the processors 130 can be dedicated controllers such as an ASIC.

The memory 120 one of the one or more computing devices 101 may include a type of non-transitory computer readable medium capable of storing information accessible by the processors 110, such as a hard-drive, solid state drive, tape drive, optical storage, memory card, ROM, RAM, DVD, CD-ROM, write-capable, and read-only memories. The computing devices 101 may implement any of a number of architectures and technologies, including, but not limited to, direct attached storage (DAS), network attached storage (NAS), storage area networks (SANs), fiber channel (FC), fiber channel over Ethernet (FCoE), mixed architecture networks, or the like. The datacenter may include a number of other devices in addition to the storage devices, such as cabling, routers, etc.

The memory 120 can store information accessible by the one or more processors 110, including data 130 that is received at or generated by the processors 110, and instructions 140 that can be executed by the one or more processors 110. The data 130 can be retrieved, stored or modified by the processors 110 in accordance with the instructions 140. For instance, although the system and method is not limited by a particular data structure, the data 130 can be stored in computer registers, in a data store as a structure having a plurality of different fields and records, or documents, or buffers. The data 130 can also be formatted in a computer-readable format such as, but not limited to, binary values, ASCII or Unicode. Moreover, the data 130 can include information sufficient to identify relevant information, such as numbers, descriptive text, proprietary codes, pointers, references to data stored in other memories, including other network locations, or information that is used by a function to calculate relevant data. The instructions 160 can be a set of instructions executed directly, such as machine code, or indirectly, such as scripts, by the processor 110. In this regard, the terms "instructions," "steps" and "programs" can be used interchangeably herein. The instructions 140 can be stored in object code format for direct processing by the processor 110, or other types of computer language including scripts or collections of independent source code modules that are interpreted on demand or compiled in advance.

The data 130 may include a database 132 storing data of one or more datasets. The clients 162, 164 may access the data in the database 132 by way of queries. Accessing data may involve requesting at least a portion of the stored data, requesting processing to be performed on at least a portion of the data, or some combination thereof. The requests may be provided by the clients 162, 164 in the form of queries, whereby a query specifies one or more parameters of the data which the client wishes to access, one or more operations to perform on the data, or both. The data 130 may further include previously received queries 134, which may be stored either temporarily or permanently. The data may further include materialized views 136 of the data in the database. The materialized view may be constructed in response to a user query. For example, the database may include several columns of data, a query may request a sum of each column, and the materialized view may include the processed sums of the columns. For further example, the query may request all rows of data for which a value in a given column exceeds a specified threshold, and the materialized view may include a subset of the data containing only the rows that meet the parameters of the query. As such, for a given database 132 stored in the memory 120, each query 134 on that database that is stored in the memory may correspond to a materialized view 136 stored in the memory.

The instructions 140 may include various algorithms for instructing the processor 110 to execute operations in accordance with the routines described herein. For example, the instructions 140 may include a query processing routine 142 for processing queries received from clients over the network and returning data from the database 132 to the clients in response to the queries. For further example, the instructions 140 may include a query rewrite checking routines 144 for determining whether a previously stored query result satisfies a newly received query. Using the previously stored query result to process the newly received query can reduce processing time and overhead at the computing systems, thereby reducing time and usage costs for processing the query.

As discussed in greater detail herein, the query rewrite checking routines 144 of the present disclosure are capable of checking queries that are not limited to defined values, and particularly queries that include NULL values, such as SQL queries. These routines are described in greater detail in connection with the flow diagrams of FIGS. 2-4. It should be understood that the routines described herein are merely examples, and in other examples, certain steps may be added, subtracted, replaced or reordered.

Although FIG. 1 functionally illustrates each of the processor 110 and memory 120 as being a single block, the processor 110 and memory 120 may actually include multiple processors and memories that may or may not be stored within the same physical housing. For example, some of the data 130 and instructions 140 stored in the memory can be stored on a removable CD-ROM and others within a read-only computer chip. Some or all of the instructions and data can be stored in a location physically remote from, yet still accessible by, the processors 110.

Figure 2:
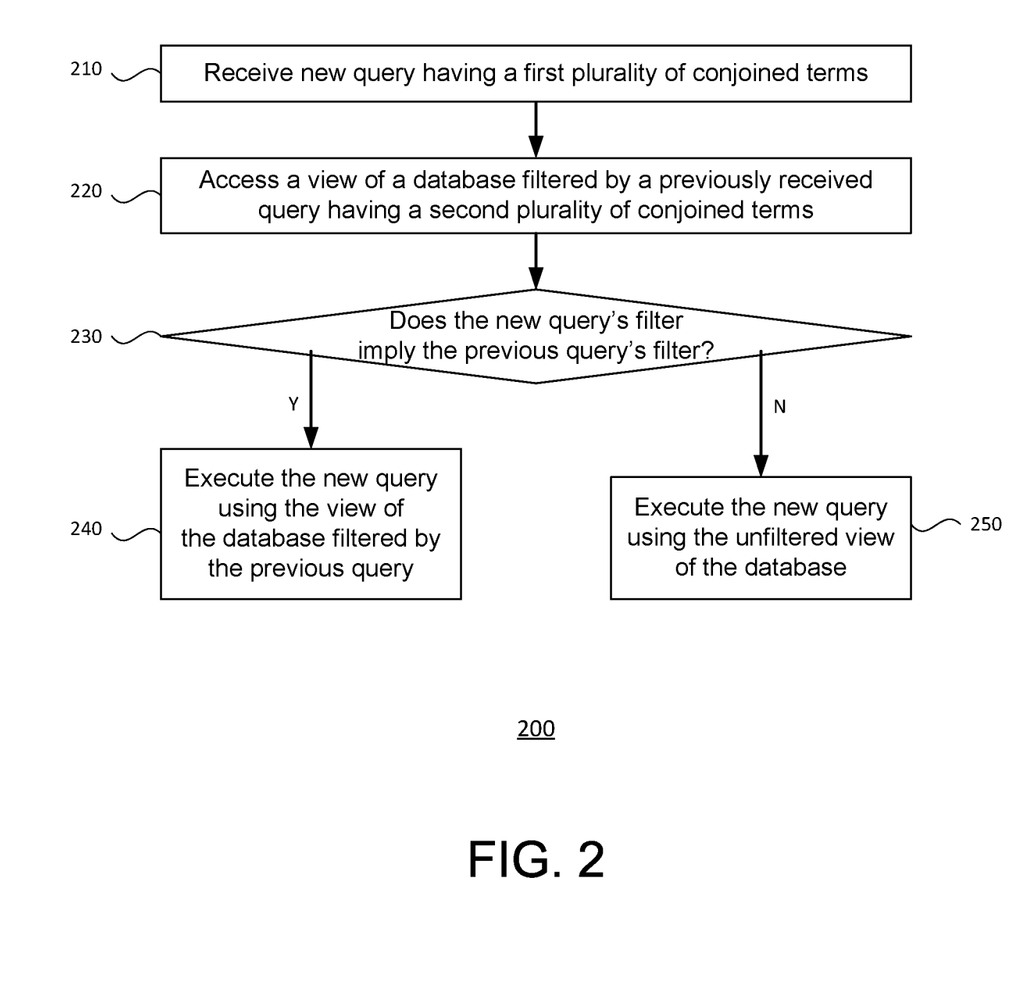
FIG. 2 is a flow diagram illustrating an example routine in accordance with an aspect of the present disclosure.

FIG. 2 is a flow diagram illustrating an example routine 200 for processing new queries. The routine may be executed by one or more processors, such as processor 110 shown in FIG. 1.

At block 210, a new query Q on a stored dataset is received. The new query Q may include a conjunction of terms Q1, . . . , QN for processing data of the stored dataset. The terms may be joined using any combination of AND operators, OR operators, or other operators. Furthermore, the terms may include one or more NULL values to indicate values that are not defined. The new query Q may function as a filter, whereby processing the dataset using the query may return a filtered view of the dataset.

At block 220, a previously stored materialized view of the dataset is accessed. The materialized view may be a previously filtered version of the dataset created from a previously received query V. Like the new query Q, the previously received query V may include a conjunction of terms V1, . . . , VN, although the terms of the new query Q and the previous query V may be different since the queries themselves may be different. Also like the new query Q, the terms of the previous query V may be joined using any combination of AND operators, OR operators, or other operators, and may include one or more NULL values.

At block 230, in order to determine whether the materialized view yielded by the previous query V is complete enough to process the new query Q, it is determined whether the filter of the new query Q implies the filter of the previous query V. This may be achieved by comparing the two queries. Stated another way, the comparison may confirm that for any case in which Q evaluates to true, then V will necessarily evaluate to true as well, thus making V a suitable query for replacing Q.

Queries Q and V may include several terms each, whereby comparison of the queries can be difficult. Therefore, in order to facilitate the comparison, the queries Q and V may first be broken down into smaller components, and then those components may be compared to one another. For instance, the queries can be broken down into a simplified clause, such as an AND-clause (a set of terms combined by AND operators) or an OR-clause (a set of terms combined by OR operators). For further instance, the clauses can be further broken down into several terms, which may be the individual components of an AND-clause separated by the AND operators or the individual components of an OR-clause separated by the OR operators. Breaking down the larger filters into these simpler clauses and smaller terms allows for faster and more efficient processing, since comparing individual terms to one another is much simpler than comparing the larger filters.

If it is determined at block 230 that the filter of the new query Q implies the filter of the previous query V, then operations may proceed at block 240, with the new query being executed using the materialized view of the dataset that was already filtered by the previous query V. This avoids the need for processing the entire dataset in order to respond to the new query Q, which in turn can lead to significant reductions in query processing time and processing costs.

Conversely if it is determined at block 230 that the filter of the new query Q does not imply the filter of the previous query V, then operations may proceed at block 250, with the new query being executed using the unfiltered view of the dataset. Since the materialized view of the previous query was determined to not return or process all of the data called by the new query, the system determined that it was unable to use the materialized view as a shortcut. However, after processing the new query, the new query may and the associated materialized view created by the new query may be saved for future reference and for processing future queries.

The example of FIG. 2 generally describes a comparison between one new query and one previous query. However, it should be recognized that the memory may store multiple previous queries, that the multiple previous queries may be associated with different materialized views, and that any new query can be compared to any number or all of the previous queries to determine whether any of the materialized views satisfies the new query. In some instances, multiple stored views may satisfy the new query, whereby a selection algorithm for choosing a best view, for instance a smallest view, may be implemented.

Figure 3:
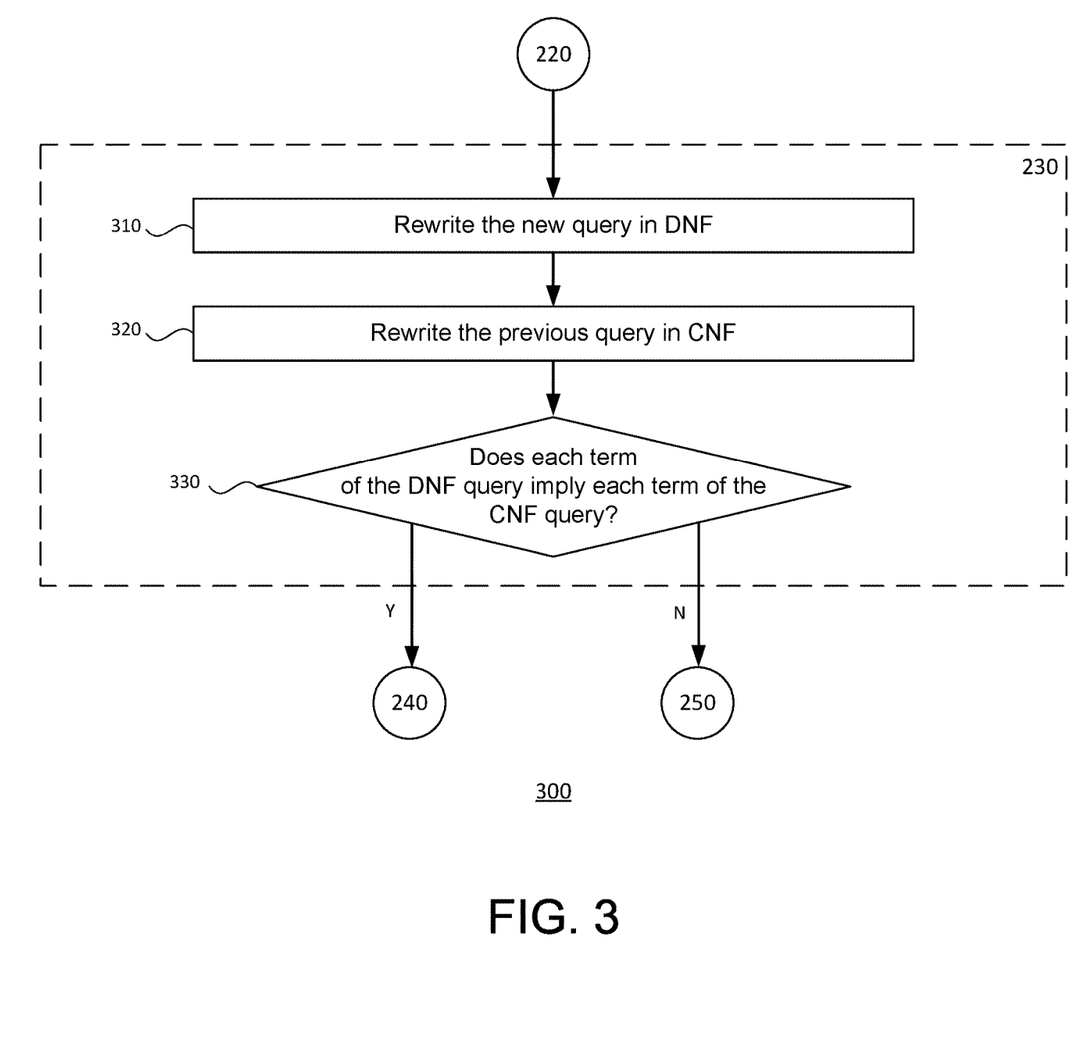
FIG. 3 is a flow diagram illustrating an example subroutine of the routine of FIG. 2.

FIG. 3 is a flow diagram illustrating an example subroutine 300 for determining whether the filter of the new query Q implies the filter of the previous query V.

At block 310, the new query is rewritten in disjunctive normal form (DNF), also referred to as an "OR of ANDs" or an "OR-clause." The DNF expression includes multiple terms that are joined by "OR" operators, while the OR-clause itself may include one or more terms that are joined using "OR" operators. For instance, "x=6 OR (x>3 AND y>8) OR (NOT(x=0) AND (y IS NULL))" is written in DNF form, and it includes three terms, the first of which is x=6, the second of which is x>3 AND y>8, and the third of which is NOT(x=0) AND (y IS NULL). It should be noted that the entire query is true if at least one of the terms is determined to be true. Additionally, it should be noted that the query written in DNF form may include NULL values, such as "y IS NULL."

At block 320, the previous query is rewritten in conjunctive normal form (CNF), also referred to as an "AND or ORs" or an "AND-clause." The CNF expression includes multiple terms that are joined by "AND" operators, while the AND-clause itself may include one or more terms combined using "AND" operators. For instance, "(x>5 OR y>10) AND ((NOT (x IS NULL)) OR y>20)" is written in CNF form, and it includes two terms, the first of which is x>5 OR y>10 and the second of which is NOT (x IS NULL) OR y>20. It should be noted that the entire query is true only if all of the terms are determined to be true. Additionally, it should be noted that the query written in CNF form may include NULL values, such as "y IS NOT NULL."

Once the new query and previous query have been rewritten into DNF and CNF form, respectively, at block 330, each term of the rewritten new query is compared to the rewritten previously received query to determine whether each term of the new query implies each term of the previously received query. This may involve the two queries being compared with one another term by term. For example, a term of the DNF expression and a term of the CNF expression may be selected, and it may be determined whether the chosen DNF term implies the chosen CNF term. Terms from the CNF and DNF clauses may be chosen iteratively until all terms have been compared.

Comparing individual terms to determine implications may involve one or more logical rules. For instance, constants and variables may be compared using any of the operators =, !=, <, <=, >, or >=. Similarly, combined constants and variables may be compared according to basic arithmetic rules, such as recognizing that x>A implies x>=A+1 and that x<=A implies x<A+1. Additionally, a variable limited to a range of values may be determined to not be NULL. The following examples illustrate a few of the logical rules that may be applied to some example terms:

x=4 implies x>=3.
x<7 implies x<=7.
x<7 implies x<=6 (for discrete types).
x<8 implies x IS NOT NULL.

x<7 AND x>1 implies x<8 AND x>0.

Using the previous example of comparing the DNF term x=6 OR (x>3 AND y>8) OR (NOT(x=0) AND (y IS NULL)) to the CNF term "(x>5 OR y>10) AND ((NOT (x IS NULL)) OR y>20) for illustration purposes:

First, a first DNF term x=6 and a first CNF term (x>5 OR (y IS NOT NULL)) may be chosen. The first DNF term includes only one expression, x=6. The first CNF term is satisfied by either expression x>5 or y>10. Since 6 is a value that is greater than 5, the determination may be made that x=6 implies x>5, and thus the DNF term implies the CNF term.

Next, the first DNF term x=6 and a second CNF term ((NOT (x IS NULL)) OR y>20) may be chosen. Since x=6, its value is not NULL, and the first DNF term is determined to imply the second CNF term as well.

Next, the second DNF term x>3 AND y>8 and the first CNF term (x>5 OR (y IS NOT NULL)) may be chosen. Since y is not a NULL value in the second DNF term (it must be greater than 8), the second DNF term is determined to imply the first CNF term as well.

Next, the second DNF term x>3 AND y>8 and the second CNF term ((NOT (x IS NULL)) OR y>20) may be chosen. Since x is not a NULL value in the second DNF term (it must be greater than 3), the second DNF term is determined to imply the second CNF term as well.

Next, the third DNF term NOT(x=0) AND (y IS NULL) and the first CNF term (x>5 OR (y IS NOT NULL)) may be chosen. For this comparison, the DNF term does not imply the CNF term, since there are cases (x,y) for which the DNF term returns false but the CNF term returns true, such as any case (x,y) in which y is not NULL. Therefore, in this example, the comparison of the new and previous queries may determine that the new query does not imply the previous query, and operations may continue at block 250.

In an alternative example in which the new query includes only: "x=6 OR (x>3 AND y>8)" and does not state: "OR (NOT(x=0) AND (y IS NULL))," then the comparison at block 330 may be different. In this case, since each DNF term of the new query will have been determined to imply each CNF term of the previous query, the comparison of the new and previous queries may determine that the filter of the new query does imply the filter of the previous query, and operations may continue at block 240.

Figure 4:
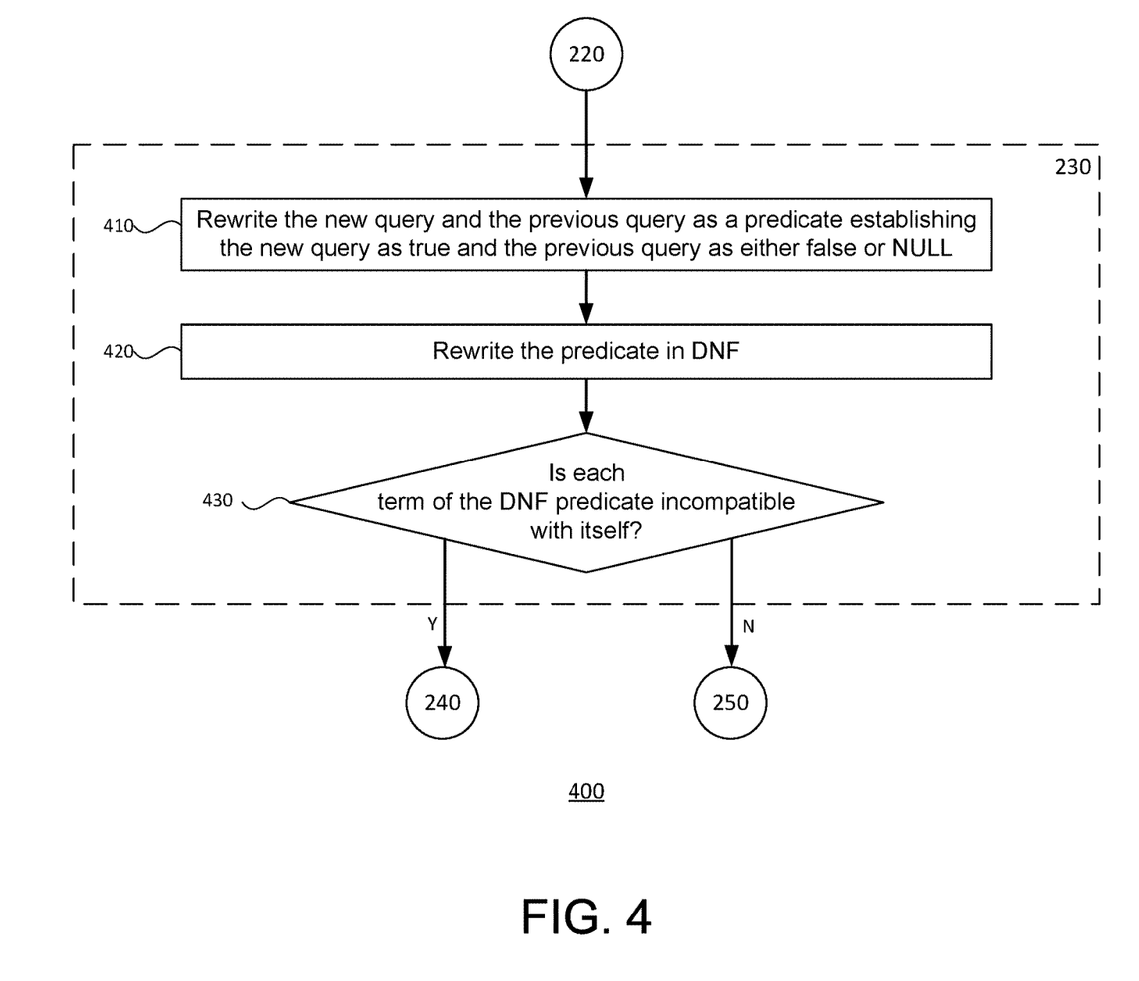
FIG. 4 is a flow diagram illustrating an alternative example subroutine of the routine of FIG. 2.

FIG. 4 is a flow diagram illustrating an alternative example subroutine 400 for determining whether the filter of the new query Q implies the filter of the previous query V.

At block 410, the new query and the previous query are rewritten as a predicate establishing the new query as true and the previous query as either false or NULL. The predicate may indicate whether or not there is any case for which the new query evaluates to true while the previous query evaluates to false, which would in turn indicate whether the filter of the new query fails to imply the filter of the previous query. In this regard, the predicate may be expressed as "Q AND ((NOT V) OR (V IS NULL)).

At block 420, the predicate is rewritten in DNF, whereby multiple terms are separated by Or operators. Rewriting the predicate in DNF allows for each term of the DNF clause to be evaluated independently.

At block 430, it is determined whether each term of the DNF clause is incompatible with itself, meaning that the term contains an incompatibility or contradiction. Incompatibilities and contradictions are generally compared between two expressions contained with the term. Each term of the DNF-predicate is separated by an OR-operator, but may contain multiple expressions connected with an AND operator. As such, if two expressions are connected with an AND operator but incompatible with one another (such as "x<1" and "x>2", such as or "y is NULL" and "y=5"), then the term may be determined to be incompatible with itself or self-contradictory. Because the DNF-predicate is simply a rewriting of the original predicate, each DNF term containing an incompatibility or self-contradiction means that the original predicate as a whole contains within itself this incompatibility or self-contradiction. Thus, the predicate demonstrates that it would be inconsistent or self-contradictory for Q to evaluate to true while V evaluates to false or NULL. Furthermore, if every DNF term is incompatible with itself, this would indicate that for every Q that evaluates to true, V will necessarily also evaluate to true. Thus Q implies V. Conversely, if any DNF term is not found to be incompatible with itself, it would not be possible to prove that for every Q that evaluates to true, V will necessarily also evaluate to true. Thus Q would not imply V and the materialized dataset generated by V could not be relied on to execute Q.

For example, if a new query is "x>1 OR (y IS NULL))," and a previous query is "x>0 OR (y IS NOT NULL)," then these queries may be rewritten as the predicate:

$$(x>1 \text{ OR } (y \text{ IS NULL})) \text{ AND } (\text{NOT}(x>0 \text{ OR } (y \text{ IS NOT NULL})) \text{ OR } (x>0 \text{ OR } (y \text{ IS NOT NULL}) \text{ IS NULL})), \qquad 1)$$

In order to complete the evaluation at block 430, the predicate may be simplified using various operations. At least some simplifications may be performed before the predicate is rewritten in DNF at block 420. For example, a first operation for simplifying the predicate may involve simplifying the "V IS NULL" portion of the predicate. The following examples illustrate a few of the logical rules that may be applied to simply some example expression containing NULL:

NULL is NULL→TRUE
7 is NULL→FALSE
x is NULL→(cannot be simplified)
(x<y) is NULL→(X is NULL) OR (Y is NULL)
(NOT x) is NULL→P is NULL
(x is NULL) is NULL→FALSE
(x1 AND x2 AND . . . AND xN) is NULL→((x1 OR (x1 is NULL)) AND (x2 OR (x2 is NULL)) AND . . . AND (xN OR (xN is NULL)) AND ((x1 is NULL) OR (x2 is NULL) OR . . . OR (xN is NULL))
(x1 OR x2 OR . . . OR xN) is NULL→((NOT x1) OR (x1 is NULL)) AND ((NOT x2) OR (x2 is NULL)) AND . . . AND ((NOT xN) OR (xN is NULL)) AND ((x1 is NULL) OR (x2 is NULL) OR . . . OR (xN is NULL))

Taking the case of the above example "(x>0 OR (y IS NOT NULL)) IS NULL," since it is clear that x>0 is incompatible with x IS NULL and further that y IS NOT NULL is incompatible with y IS NULL, this statement can be simplified to "FALSE." Thus, the predicate may be simplified to:

$$(x>1 \text{ OR } (y \text{ IS NULL})) \text{ AND } (\text{NOT}(x>0 \text{ OR } (y \text{ IS NOT NULL})) \text{ OR } (\text{FALSE})) \qquad 2)$$

Another operation for simplifying the predicate may involve simplifying the "NOT B" portion of the predicate, in this case "NOT(x>0 OR (y IS NOT NULL))." This is the same as "x<0 AND (y IS NULL)," such that the entire predicate rewrites to:

$$((x>1) \text{ OR } (y \text{ IS NULL})) \text{ AND } (((x \leq 0) \text{ AND } (y \text{ IS NULL})) \text{ OR } (\text{FALSE})) \qquad 3)$$

For sake of clarity, predicate is rewritten below with "a" to represent x>1, "b" to represent (y IS NULL) and "c" to represent x<0, before being rewritten in DNF:

$$(a \text{ OR } b) \text{ AND } ((c \text{ AND } b) \text{ OR } (\text{FALSE})) \qquad 4)$$

It can be seen from the above example that simplifying the predicate can make it easier for the predicate to be rewritten in DNF as performed at block 420. In this particular example, the DNF of the example predicate is set of four terms separated by OR operators:

$$[a \text{ AND } b \text{ AND } c] \text{ OR } [a \text{ AND FALSE}] \text{ OR } [b \text{ AND } c] \text{ OR } [b \text{ AND FALSE}] \qquad 5)$$

Finally the predicate may be evaluated for incompatibilities as performed at block 430. Incompatibilities may be evaluated interactively, beginning at a first term and ending at a last term in the sequence. Evaluation operations may continue at least until one term is found that is compatible with itself. If this occurs, then operations may continue at block 250, since the materialized view of previous query V will have been determined unsuitable for new query Q. However, if each term is determined to be incompatible with itself, then operations may continue at block 240, with evaluation of the new query Q using the materialized view of query V.

Taking the above example predicate for instance, the second and fourth terms of the predicate as rewritten in DNF are clearly incompatible as they have already been simplified to "FALSE." The first term includes one expression "a" that requires x>1 and another expression "c" that requires x≤0. These requirements are contradictory to one another, so it may be determined that the first term is also incompatible.

However, every term of the DNF-predicate must be incompatible with itself in order to determine that the filter of the new query implies the filter of the previous query. In the present example, the third term includes one expression "b" that requires y IS NULL and another expression x>0, but these terms are not incompatible with one another. Therefore, it can be seen that some set of variables x,y for which at least this clause of the predicate is satisfied, meaning that the new query would return "TRUE" but the previous query would return "FALSE" or "NULL." This indicates that the filter of the new query does not imply the filter of the previous query, and thus the new query cannot be processed using the materialized view derived from the previous query. Instead, it may be determined to execute the new query using the normal view of the data set.

The routine 200 may include instructions for choosing between the subroutines 300, 400. The choice may be based on Q and V, whereby one subroutine may be preferred for simpler or shorter queries while the other subroutine may be preferred for more complex or longer queries. For instance, if it is determined that rewriting the new query or predicate in DNF is longer for one subroutine than the other, then the subroutine resulting in the shorter DNF rewriting may be chosen. In other instances, one subroutine may be chosen as a default unless an error is encountered, such as the presence of an expression or collection of expressions that the subroutine does not support.

Additional steps may be added to the routine 200 and subroutines 300, 400 in order to simplify the evaluation process. One example additional step may include, before rewriting the new and previous queries in either DNF and CNF respectively or as a predicate, rewriting the queries to share a common set of variables. For instance, if a variable w can be rewritten as a different variable x, then this step may involve rewriting w as x. For instance, if the new query contains a constraint on a variable w that was not constrained in the previous query, then the constraints on w in the new query may be excluded from evaluation of the new query, since it may be assumed that the previous query contains all data concerning w in the dataset. This step may reduce the total number of variables to be evaluated in the queries.

Another example additional step may include, before rewriting the new and previous queries in either DNF and CNF respectively or as a predicate, removing of the new and previous queries that are structurally equivalent. Terms that are logically equivalent but written differently, such as a first term "x>5 AND y>6" and a second term "NOT(x≤5 OR y≤6), are not removed by this step. This approach can reduce the total number of terms in the evaluation.

A further example additional step may include, after removing the structurally equivalent terms, determining whether any of the remaining terms refer to columns that are not keys of a grouping operation. If any of the remaining terms refer to columns that are not grouping keys, then it can be preemptively determined to not use the filtered view. Conversely, if none of the remaining terms refer to columns that are not grouping keys, then operations may continue with rewriting the new and previous queries in either DNF and CNF respectively or as a predicate.

The above example methods provide a way for SQL queries to be evaluated and compared with previous queries and the filtered views generated by those queries. As such, it may be determined whether a new query may be processed using a previously stored and indexed view of the queried database. This in turn can lead to improved computer operation and function, including but not limited to faster processing times and reduced overhead for SQL query processing.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

Most of the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. As an example, the preceding operations do not have to be performed in the precise order described above. Rather, various steps can be handled in a different order, such as reversed, or simultaneously. Steps can also be omitted unless otherwise stated. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method comprising:
receiving, by one or more processors, a new query comprising a first plurality of conjoined terms;

accessing, by the one or more processors, a filtered view of a database from memory, wherein the filtered view is filtered by the previously received query according to a filter represented by a second plurality of conjoined terms, wherein at least one of the first plurality of conjoined terms or the second plurality of conjoined terms includes at least one NULL value;

rewriting, by the one or more processors, the new query and the previously received query to share a common set of variables;

rewriting, by the one or more processors, the new query in disjunctive normal form;

rewriting, by the one or more processors, the previously received query in conjunctive normal form;

determining, by the one or more processors, that the filter of the new query implies a filter of the previously received query based on each term of the rewritten new query implying each term of the rewritten previously received query; and based on the determination that the filter of new query implies the filter of the previously received query, executing, by the one or more processors, the new query using the filtered view of the previously received query.

2. The method of claim 1, wherein either the previously received query or the new query includes a grouping operation, and wherein determining that the filter of the new query implies the filter of the previously received query comprises, before rewriting the new query in disjunctive normal form and the previously received query in conjunctive normal form, removing terms of the previously received query or the new query that refer to columns that are not keys of the grouping operation.

3. The method of claim 1, wherein determining that the filter of the new query implies the filter of the previously received query comprises, before rewriting the new query in disjunctive normal form and the previously received query in conjunctive normal form, removing terms of the previously received query and of the new query that are structurally equivalent.

4. The method of claim 3, further comprising, after removing the terms of the previously received query and of the new query that are structurally equivalent, determining that the filter of the new query implies the filter of the previously received query based on part on none of the remaining terms referring to columns that are not grouping keys.

5. The method of claim 1, further comprising:
receiving, by the one or more processors, a second new query comprising a third plurality of conjoined terms;
accessing, by the one or more processors, the filtered view of the previously received query from memory, wherein at least one of the second plurality of conjoined terms or the third plurality of conjoined terms includes at least one NULL value;
determining, by the one or more processors, that the filter of the second new query does not imply the filter of the previously received query; and
in response to the determination that the filter of the second new query does not imply the filter of the previously received query, executing the second new query on the database.

6. The method of claim 5, wherein determining that the filter of the second new query does not imply the filter of the previously received query comprises:
rewriting the second new query and the previously received query as a predicate establishing the second new query as being true and the previously received query as being either false or NULL;
rewriting the predicate in disjunctive normal form; and
determining that at least one term of the rewritten predicate is not incompatible with itself, wherein the determination that the filter of the second new query does not imply the filter of the previously received query is based on the at least one term of the rewritten predicate not being incompatible with itself.

7. A method comprising:
receiving, by one or more processors, a new query comprising a first plurality of conjoined terms;
accessing, by the one or more processors, a filtered view of a database from memory, wherein the filtered view is filtered by the previously received query according to a filter represented by a second plurality of conjoined terms, wherein at least one of the first plurality of conjoined terms or the second plurality of conjoined terms includes at least one NULL value;
rewriting, by the one or more processors, the new query and the previously received query as a predicate establishing the new query as being true and the previously received query as being either false or NULL;
rewriting, by the one or more processors, the predicate in disjunctive normal form;
determining, by the one or more processors, that each term of the rewritten predicate is incompatible with itself;
determining, by the one or more processors, that the new query implies the filter of the previously received query is-based on each term of the rewritten predicate being incompatible with itself; and
based on the determination that the filter of new query implies the filter of the previously received query, executing, by the one or more processors, the new query using the filtered view of the previously received query.

8. The method of claim 7, wherein the method further comprises, before rewriting the predicate in disjunctive normal form comprises, simplifying at least a portion of the predicate representing the previously received query as being NULL.

9. The method of claim 7, further comprising:
receiving, by the one or more processors, a second new query comprising a third plurality of conjoined terms;
accessing, by the one or more processors, the filtered view of the previously received query from memory, wherein at least one of the second plurality of conjoined terms or the third plurality of conjoined terms includes at least one NULL value;
determining, by the one or more processors, that the filter of the second new query does not imply the filter of the previously received query; and
in response to the determination that the filter of the second new query does not imply the filter of the previously received query, executing the second new query on the database.

10. The method of claim 9, wherein determining that the filter of the second new query does not imply the filter of the previously received query comprises:
rewriting the second new query and the previously received query to share a common set of variables;
rewriting the second new query in disjunctive normal form;
rewriting the previously received query in conjunctive normal form; and determining that at least one term of the rewritten second new query does not imply at least one term of the rewritten previously received query, wherein the determination that the new query does not imply the previously received query is based on at least one term of the rewritten second new query not implying at least one term of the rewritten previously received query.

11. A system comprising:
memory for storing instructions; and
one or more processors coupled to the memory and configured to execute the stored instructions to:
   receive a new query comprising a first plurality of conjoined terms;
   access from the memory a filtered view of a database filtered by a previously received query according to a filter, wherein the filtered view is represented by a second plurality of conjoined terms, and wherein at least one of the first plurality of conjoined terms or the second plurality of conjoined terms includes at least one NULL value;
   rewrite the new query and the previously received query to share a common set of variables;
   rewrite the new query in disjunctive normal form;
   rewrite the previously received query in conjunctive normal form;
   determine that the filter of the new query implies a filter of the previously received query based on each term of the rewritten new query implying each term of the rewritten previously received query; and
   based on the determination that the filter of the new query implies the filter of the previously received query, execute the new query using the filtered view of the database.

12. The system of claim 11, wherein either the previously received query or the new query includes a grouping operation, and wherein determining that the filter of the new query implies the filter of the previously received query comprises, before rewriting the new query in disjunctive normal form and the previously received query in conjunctive normal form, removing terms of the previously received query or the new query that refer to columns that are not keys of the grouping operation.

13. The system of claim 11, wherein the one or more processors are configured to execute the stored instructions to, before the new query is rewritten in disjunctive normal form and the previously received query in conjunctive normal form, remove terms of the previously received query and of the new query that are structurally equivalent.

14. The system of claim 11, the one or more processors are configured to execute the stored instructions to:
   receive, by one or more processors, a second new query comprising a third plurality of conjoined terms;
   access, by the one or more processors, the filtered view of the previously received query from memory, wherein at least one of the second plurality of conjoined terms or the third plurality of conjoined terms includes at least one NULL value;
   determine, by the one or more processors, that the second new query does not imply the previously received query; and
   in response to the determination that the new query does not imply the previously received query, execute the new query on the database.

15. The system of claim 14, wherein the one or more processors are configured to execute the stored instructions to:
   rewrite the second new query and the previously received query to share a common set of variables;
   rewrite the second new query in disjunctive normal form;
   rewrite the previously received query in conjunctive normal form; and
   determine that at least one term of the rewritten second new query does not imply at least one term of the rewritten previously received query, wherein the determination that the new query does not imply the previously received query is based on at least one term of the rewritten second new query not implying at least one term of the rewritten previously received query.

16. The system of claim 11, further comprising:
   a datacenter including a plurality of servers for storing a database and the filtered view of the database.

17. The system of claim 16, wherein the plurality of servers are configured to provide access to the filtered view of the database for execution of the new query in response to the determination that the filter of the new query implies the filter of the previously received query, and to provide access to the database for execution of the new query in response to a determination that the filter of the new query does not imply the filter of the previously received query.

18. A system comprising:
memory for storing instructions; and
one or more processors coupled to the memory and are configured to execute the stored instructions to:
   receive a new query comprising a first plurality of conjoined terms;
   access from the memory a filtered view of a database filtered by a previously received query according to a filter, wherein the filtered view is represented by a second plurality of conjoined terms, and wherein at least one of the first plurality of conjoined terms or the second plurality of conjoined terms includes at least one NULL value;
   rewrite the new query and the previously received query as a predicate establishing the new query as being true and the previously received query as being either false or NULL;
   rewrite the predicate in disjunctive normal form;
   determine that each term of the rewritten predicate is incompatible with itself;
   determine that the filter of the new query implies the filter of the previously received query based on each term of the rewritten predicate being incompatible with itself; and
   based on the determination that the filter of the new query implies the filter of the previously received query, execute the new query using the filtered view of the database.

19. The system of claim 18, wherein the one or more processors are configured to execute the stored instructions to, before the predicate is rewritten in disjunctive normal form, simplify at least a portion of the predicate representing the previously received query as being NULL.

20. The system of claim 18, wherein the one or more processors are configured to execute the stored instructions to:
   receive, by one or more processors, a second new query comprising a third plurality of conjoined terms;
   access, by the one or more processors, the filtered view of the previously received query from memory, wherein at least one of the second plurality of conjoined terms or the third plurality of conjoined terms includes at least one NULL value;

determine, by the one or more processors, that the second new query does not imply the previously received query; and in response to the determination that the new query does not imply the previously received query, execute the new query on the database.

21. The system of 20, wherein the one or more processors are configured to execute the stored instructions to:

rewrite the second new query and the previously received query as a predicate establishing the second new query as being true and the previously received query as being either false or NULL;

rewrite the predicate in disjunctive normal form; and determine that at least one term of the rewritten predicate is not incompatible with itself, wherein the determination that the filter of the second new query does not imply the filter of the previously received query is based on the at least one term of the rewritten predicate not being incompatible with itself.

* * * * *